United States Patent
Yoon

(12) 
(10) Patent No.: US 6,490,073 B2
(45) Date of Patent: Dec. 3, 2002

(54) MICROACTUATOR FOR OPTICAL SWITCHING AND METHOD FOR FABRICATING THE SAME

(75) Inventor: Yong-seop Yoon, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/842,648

(22) Filed: Apr. 27, 2001

(65) Prior Publication Data

US 2002/0041421 A1 Apr. 11, 2002

(30) Foreign Application Priority Data

Sep. 29, 2000 (KR) .......................................... 2000-57516

(51) Int. Cl.⁷ ............................................... G02B 26/08
(52) U.S. Cl. ....................... 359/224; 359/298; 310/309
(58) Field of Search ................................. 359/223, 224, 359/225, 290, 298, 872, 877; 310/309

(56) References Cited

U.S. PATENT DOCUMENTS 5,959,760 A * 9/1999 Yamada et al. ............. 359/223
5,978,128 A * 11/1999 Yoon .......................... 359/223
6,307,169 B1 * 10/2001 Sun et al. .................... 200/181
6,396,619 B1 * 5/2002 Huibers et al. ............. 359/291

* cited by examiner

Primary Examiner—Mark A. Robinson
(74) Attorney, Agent, or Firm—Sughrue Mion, PLLC

(57) ABSTRACT

A microactuator includes a wafer; a lower electrode formed on an upper surface of the wafer; a side electrode formed on the upper surface of the wafer in a perpendicular relation with the lower electrode; a pair of supporting posts protruding from the upper surface of the wafer, spaced from the lower electrode at a predetermined distance, respectively; a reflector spaced from the side electrode at a predetermined distance, and facing the lower electrode; and a pair of torsion springs disposed between the reflector and the supporting posts, and elastically supporting the reflector enabling pivoting movement of the reflector. By employing the side electrode, the microactuator can be driven with a low voltage. Also, since the side electrode serves as a stopper, the microactuator can pivot the reflector at an exact desired angle, without having to use a separate device.

6 Claims, 5 Drawing Sheets

Ts TORQUE BY SIDE ELECTRODE
Tt TORQUE BY RESTORING FORCE OF SPRING
Tl TORQUE BY LOWER ELECTRODE

SEC II-II

SEC I-I

SEC I-I

SEC I-I

MICROACTUATOR FOR OPTICAL SWITCHING AND METHOD FOR FABRICATING THE SAME

BACKGROUND OF THE INVENTION

1. Field of the Invention

The present invention relates to a microactuator for an optical switching operation of an Optical Cross Connect (OXC) and, more particularly, to an electrostatically-driven microactuator of an improved structure which is fabricated by a Micro-Electro Mechanical System, and is capable of accurately switching an angle of an optical path while being driven by a low voltage.

This application is based on Korean Patent Application No. 2000-57516, filed Sep. 29, 2000, which is incorporated herein by reference in its entirety.

2. Description of the Prior Art

Generally, a microactuator of an Optical Cross Connect (OXC) switches an optical path of an incident ray by adjusting an angle of a reflector. The electrostatically-driven microactuator usually drives the reflector by using a Scratch Drive Actuator, or a Comb Drive Actuator. There also is a microactuator which drives the reflector without using any actuators, by using the reflector as an electrode for generating an electrostatic force with another electrode disposed below the reflector.

However, the above first and second ways of driving the reflector, i.e., the methods that use the Scratch Drive Actuator or Comb Drive Actuator, have shortcomings. Since a separate actuator is required to drive the reflector, the volume of a chip increases, while the optical path is lengthened and an optical efficiency is deteriorated. The third way of driving the reflector, using the reflector as an electrode for generating an electrostatic force, may overcome these shortcomings, since it does not require any actuators to drive the reflector.

FIG. 1 shows a microactuator for directly driving a reflector. As shown in FIG. 1, the microactuator includes an upper electrode 1 and lower electrode 2 having a hole formed therein, and a reflector 3 pivotally supported on a supporter at the same height as the upper electrode 1. The reflector 3 is an Au-coated Poly-Si, which serves as an electrode. When a predetermined voltage is applied between the upper and lower electrodes 1 and 2, electrostatic force is generated between the reflector 3 and the lower electrode 2, and the reflector 3 is pivoted downward by an angle of 90°. Accordingly, the optical path of an incident of ray from an input optical fiber 4 is switched by 90°, and the ray of light is transmitted to an output optical fiber 5.

Although the volume of the chip is not increased, due to an omission of a separate actuator, there still are problems. That is, the fabricating process is complex, and a high voltage is required to drive the reflector 3. Another problem is that the ray of light experiences loss when transmitted from the input optical fiber 4 to the output optical fiber 5 unless the reflector 3 is pivoted to an angle of 90° exactly. This means a complex structure since a separate device, such as a stopper, should be employed for an accurate pivoting movement of the reflector 3.

SUMMARY OF THE INVENTION

The present invention has been made to overcome the above-described problems of the related art, and accordingly, it is an object of the present invention to provide a microactuator which is driven by a low voltage and is capable of accurately pivoting a reflector to an angle of 90° without having to use a separate device, and a fabricating method of the same.

The above object is accomplished by a microactuator according to the present invention, including a wafer; a lower electrode formed on an upper surface of the wafer; a side electrode formed on the upper surface of the wafer in a perpendicular relation with the lower electrode; a pair of supporting posts protruding from the upper surface of the wafer, spaced from the lower electrode at a predetermined distance, respectively; a reflector spaced from the side electrode at a predetermined distance, and facing the lower electrode; and elastic means disposed between the reflector and the supporting posts, said elastic means elastically supporting the reflector and enabling pivoting movement of the reflector.

Here, the elastic means is a pair of torsion springs. The reflector is divided by a fulcrum line into one side facing the lower electrode and an other side which is longer than the one side. It is preferable that the longer other side of the reflector have a hole formed therein for minimizing the level of electrostatic force applied to the side electrode.

The above object is also accomplished by a method for fabricating a microactuator according to the present invention, including the steps of forming a lower electrode, a side electrode base and a post-base by laminating a seed layer on a wafer and then etching the seed layer forming a pattern thereon; forming a coating frame by laminating a thick photo-resist layer on the wafer and the patterned seed layer and etching the thick photo-resist layer; forming an insulating film within the coating frame and etching the insulating film by exposing the side electrode base; laminating a side electrode on the side electrode base; laminating the photo-resist layer on the side electrode and the coating frame; forming a post-hole in the coating frame and the photo-resist layer by exposing the post-base; forming a reflector, torsion springs and supporting posts by laminating a metal layer on the photo-resist layer and the post-hole and then etching the metal layer; and eliminating the thick photo-resist layer and the photo-resist layer.

BRIEF DESCRIPTION OF THE DRAWINGS

The above objects and features of this invention will become apparent through detailed descriptions of a preferred embodiment thereof with reference to the attached drawings, in which.

DETAILED DESCRIPTION OF THE PREFERRED EMBODIMENTS

Figure 1:
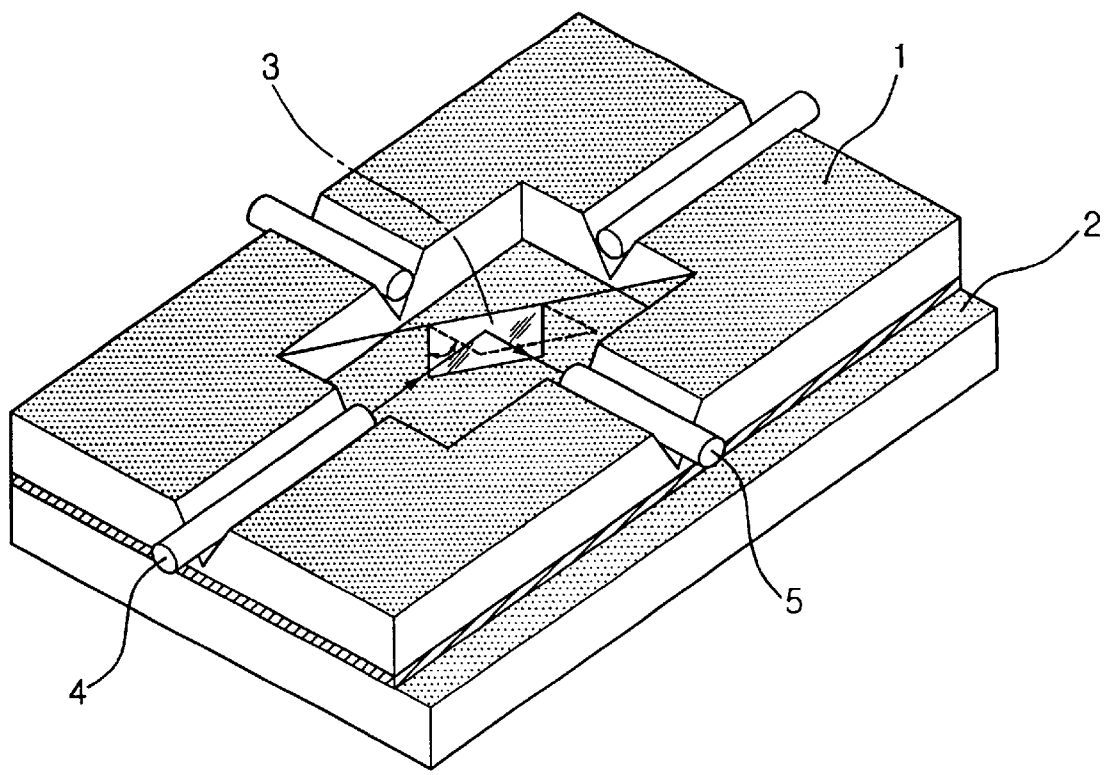
FIG. 1 is a perspective view of a conventional microactuator.
Figure 2:
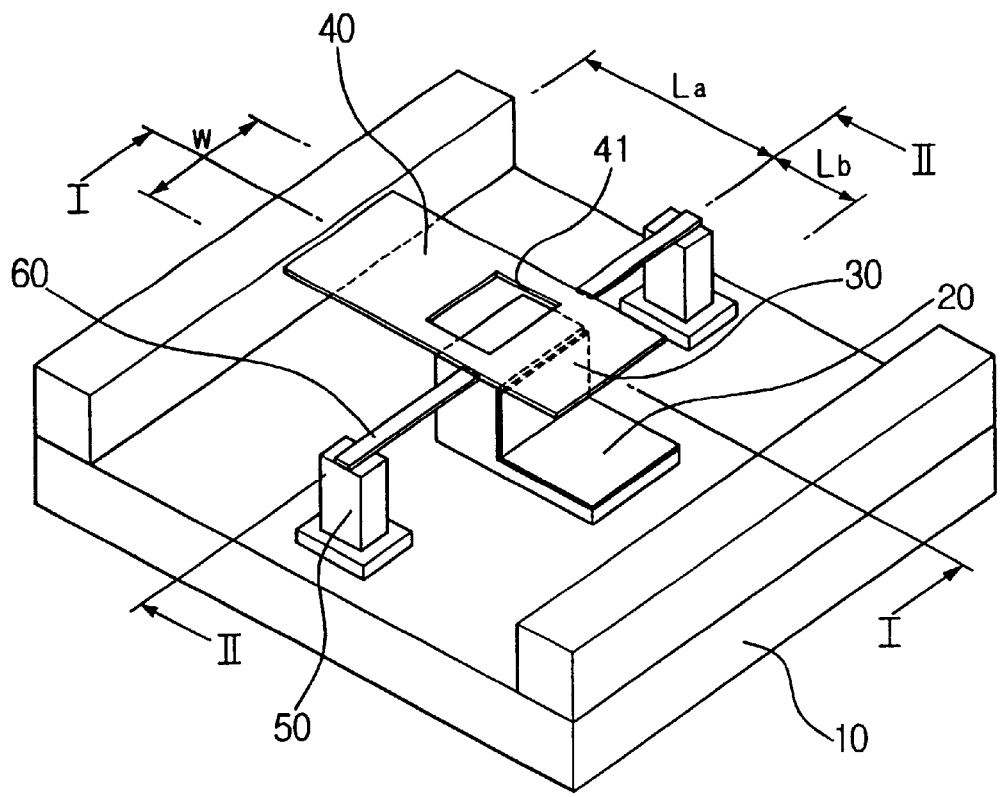
FIG. 2 is a perspective view of a microactuator according to the present invention.

The preferred embodiment of the present invention will be described hereinafter with reference to the annexed drawings. FIG. 2 is a perspective view of a microactuator according to the preferred embodiment of the present invention.

Figure 3:
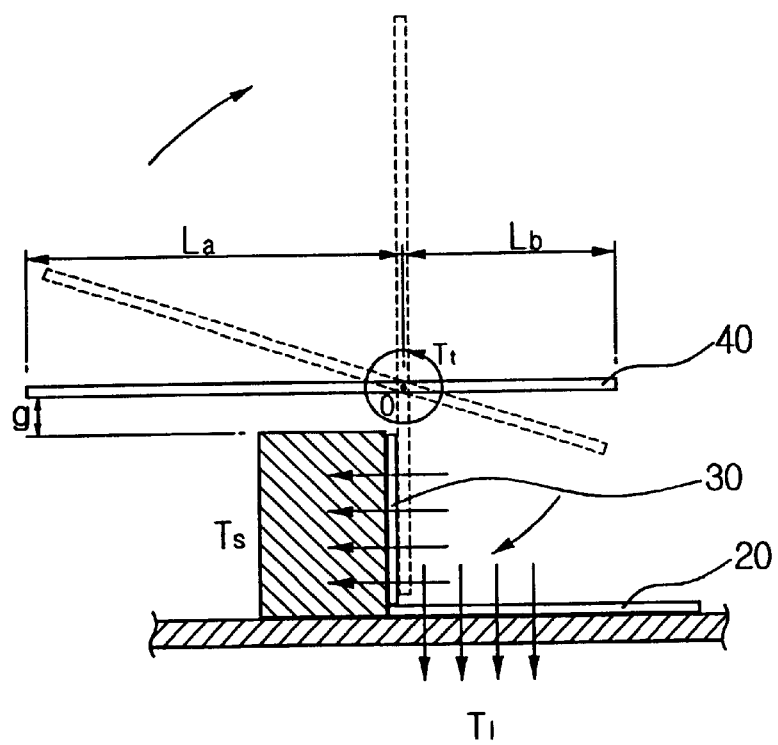
FIG. 3 is a side elevation of the microactuator shown in FIG. 2.

As shown in FIG. 2, the microactuator includes a wafer 10, a lower electrode 20 formed on the wafer 10, a side electrode 30 formed on the wafer 10 in a perpendicular relation with the lower electrode 20, a pair of supporting posts 50 protruding from the upper surface of the wafer 10 and spaced from the lower electrode 20 at a predetermined distance, respectively, a reflector 40 facing the lower electrode and spaced from the side electrode 30 at a predetermined gap g, as shown in FIG. 3, and a pair of torsion springs 60 disposed between the reflector 40 and the supporting posts 50, the torsion springs elastically supporting the reflector 40 and enabling pivoting movement of the reflector 40.

The side electrode 30 and lower electrode 20 are arranged between the pair of supporting posts 50 in the shape of alphabet letter "L".

The reflector 40 is mounted on the side electrode 30, in an asymmetrical manner. That is, a linking line between the pair of torsion springs 60, forming a fulcrum of the reflector 40, divides the reflector into two sides of different lengths. One side Lb that faces the lower electrode 20 is shorter than the other side La. By shortening one side Lb, to which electrostatic force is applied, the height of the side electrode 30 and a rotational stroke of the reflector 40 can be also shortened. Also, by forming the reflector 40 with a metal of a high reflectivity, the reflector 40 can serve as an electrode.

Also, since the electrostatic force applied by the side electrode 30 is applied all over the surface of the reflector 40, a torque from that electrostatic force is also applied to the two sides La and Lb of the reflector 40, respectively. Here, in order to prevent the side electrode 30 from deteriorating the driving efficiency of the reflector 40, a hole 41 is formed in the longer side La of the reflector 40. Since area of the longer side La of the reflector 40 is reduced by the presence of the hole 41, application of electrostatic force can be minimized and the deterioration of the driving efficiency of the reflector 40 is prevented.

Figure 6A:
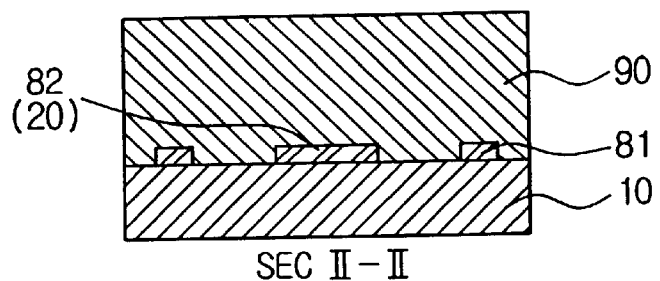
FIGS. 6A through 6G are sectional views for showing a fabricating process of the microactuator according to the present invention.
Figure 6B:
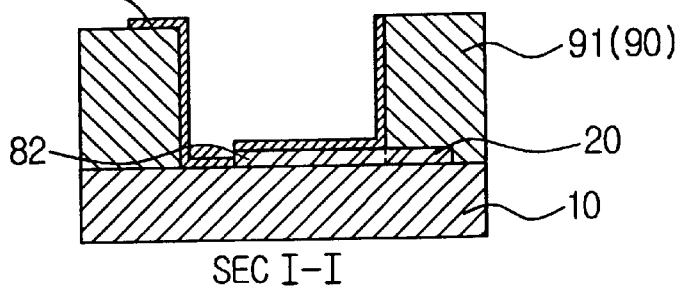
Figure 6C:
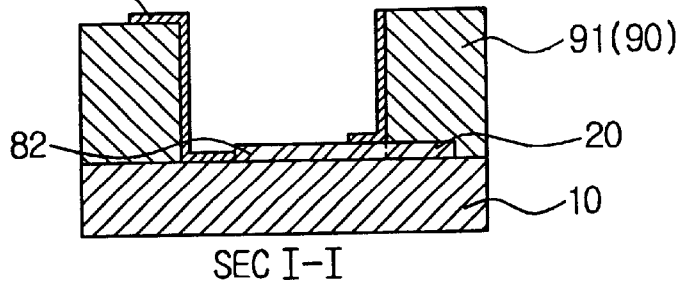
Figure 6D:
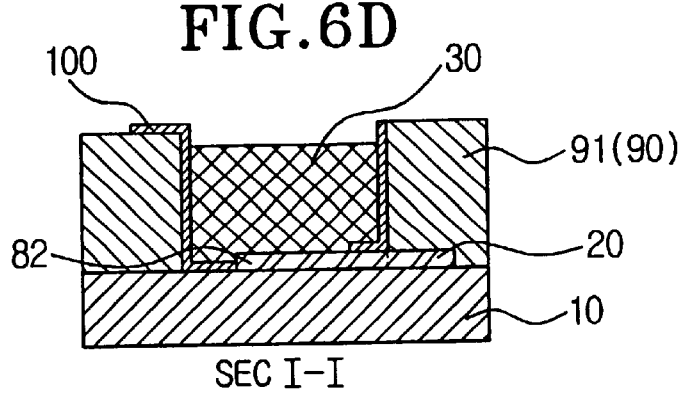
Figure 6E:
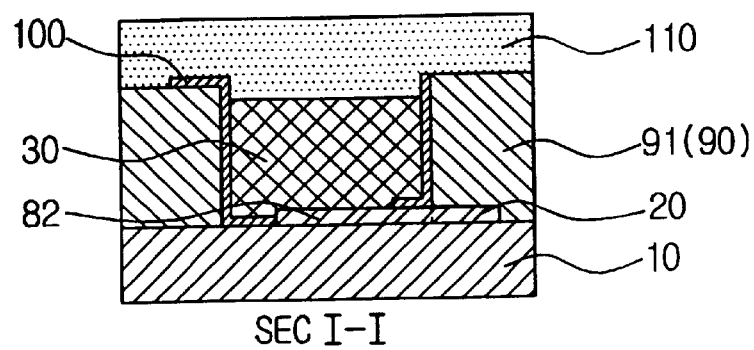
Figure 6F:
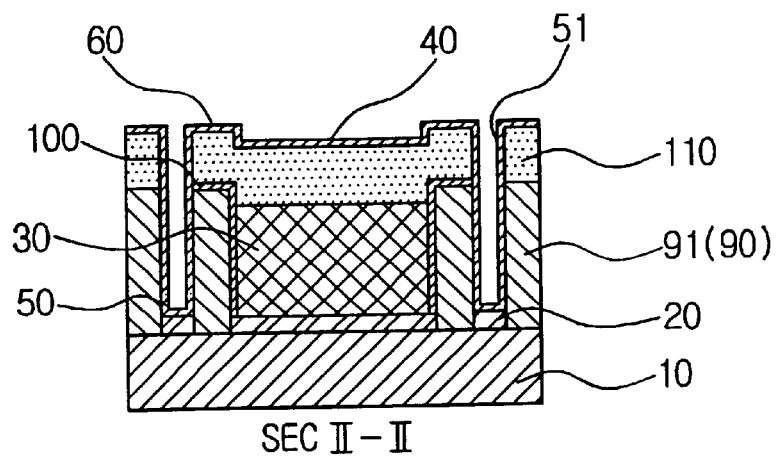
Figure 6G:
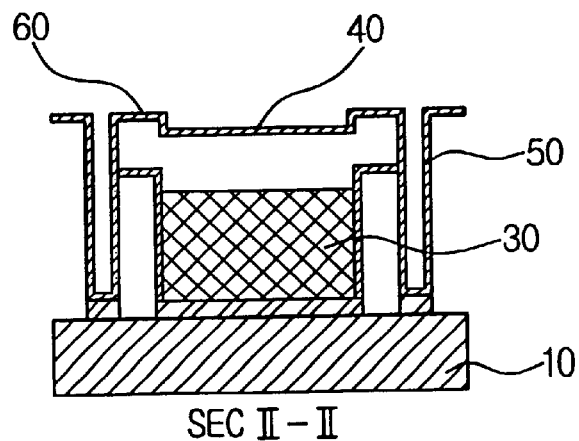

The pair of supporting posts 50 are preferably formed of hollow cylinders or hollow square beams as shown in FIG. 6G.

FIG. 3 is a side elevation view of the microactuator, for explaining the driving of the reflector 40 according to the present invention. FIG. 3 shows the reflector 40 in its initial position, i.e., the reflector 40 is parallel to the lower electrode 20. Then, when a predetermined voltage is applied to the reflector 40, the side electrode 30, and the lower electrode 20, a first electrostatic force is generated from the reflector 40 toward the lower electrode 20. Accordingly, by the first electrostatic force, a first torque T1 is generated around a fulcrum O of the reflector 40. As a result, the reflector 40 is pivoted clockwise.

When the reflector 40 is pivoted, a second electrostatic force is generated from the reflector 40 toward the side electrode 30, generating a second torque Ts around the pivot O of the reflector 40. In equation form, the first torque T1 and the second torque Ts are represented as $$T_l = \frac{\varepsilon V^2 W}{2\cos\theta \tan^2\theta} \left[ \frac{L_b \sin\theta}{H - L_b \sin\theta} + \ln\left(1 - \frac{L_b}{H}\sin\theta\right) \right] \text{ and}$$

-continued $$T_s = \frac{\varepsilon W V^2 \tan^2\theta}{\sin\theta} \left[ \ln(L_b \cos\theta + \alpha) + \frac{\alpha}{L_b \cos\theta + \alpha} - \ln\alpha - 1 \right]$$

respectively.

Here, ε is a dielectric constant in a vacuum state, V is an electric potential, W is a width of the reflector 40 (see FIG. 2), θ is a pivoting angle of the reflector 40, H is a height of the side electrode 30, and α is a thickness of an insulating layer of the side electrode 30.

When the first torque T1 and the second torque Ts pivot the reflector 30 by θ, a third torque Tt is generated at the pair of torsion springs 60 for returning the reflector 40 to the initial position. The third torque Tt is a force in an opposite direction with respect to the first torque T1 and the second torque Ts. In other words, the third torque Tt urges the reflector 40 in a counterclockwise direction. In equation form, the third torque Tt is represented as $$T_t = 2kGat^3\Theta/l$$

where, k is a spring constant, G is a shear modulus of a spring material, a is a width of the spring, l is a length of the spring, and t is a thickness of the spring.

Figure 4:
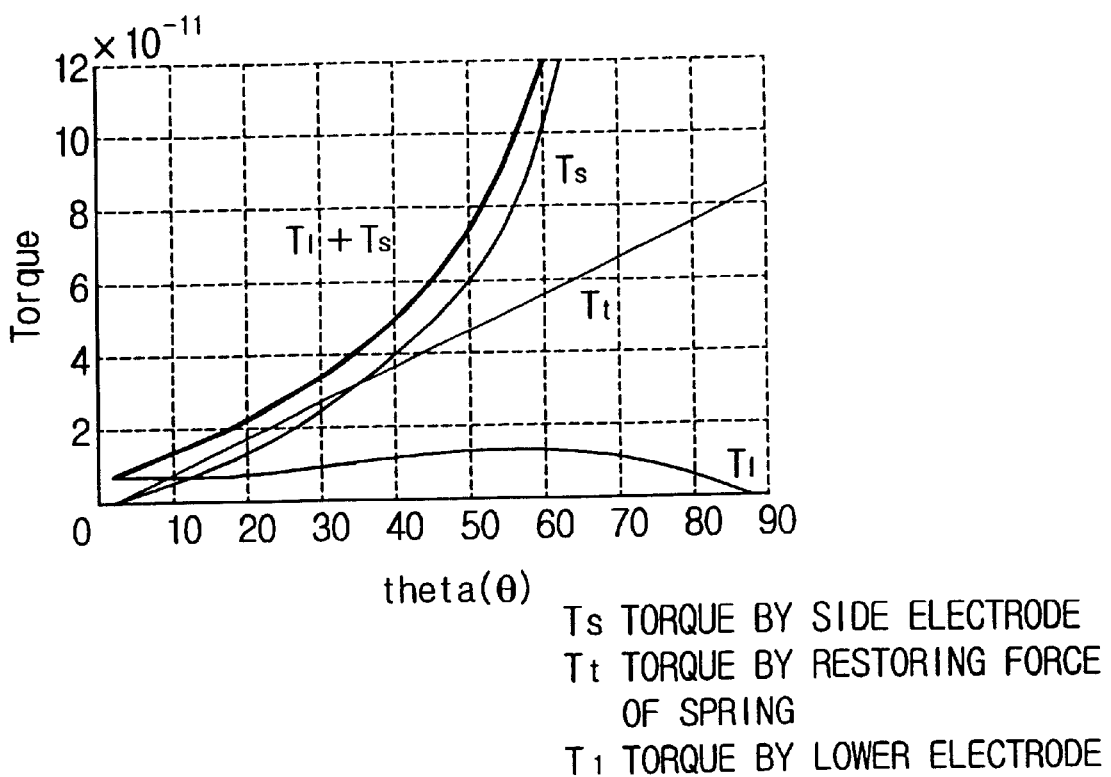
FIG. 4 is a graph showing the level of torque generated from an electrostatic force which is generated according to a pivoting angle of the reflector shown in FIG. 2.

The levels of the first torque T1, the second torque Ts, and third torque Tt are shown in FIG. 4. As shown in FIG. 4, the first torque T1, caused by the lower electrode 20, is greater than the second torque Ts, caused by the side electrode 30, when θ is less than approximately 10°. Then as θ increases, the second torque Ts also increases, soon exceeding the first torque T1. When θ reaches 90°, the second torque Ts is applied to the reflector 40 exclusively, the first torque T1 having dropped off to zero.

Compared to the conventional microactuator, the microactuator employing the side electrode 30 according to the present invention obtains a greater torque without having to increase the voltage. As a result, the microactuator according to the present invention can drive the reflector 40 to a desired angle with a voltage lower than the conventional microactuator requires.

Also, within the range of θ shown in FIG. 4, the summation of the first torque T1 and the second torque Ts is greater than the third torque Tt which is generated by the recovering force of the spring. Accordingly, the reflector 40 can be pivoted to 90° exactly, contacting with the side electrode 30, thereby reflecting the incident of ray and switching the optical path.

Figure 5:
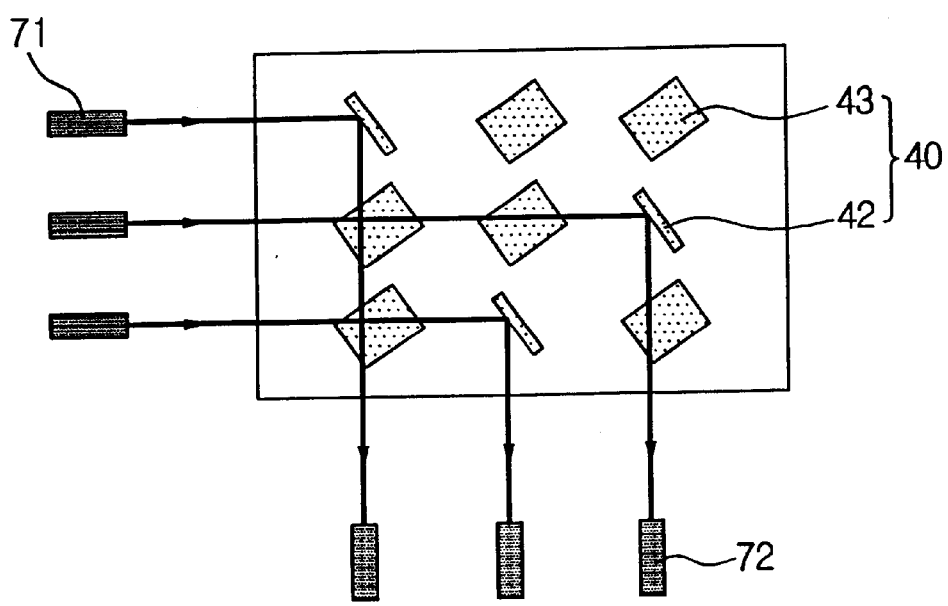
FIG. 5 is a schematic view showing a 3 by 3 optical switch employing a microactuator according to the present invention.

FIG. 5 schematically shows a 3 by 3 optical switch employing the microactuator according to the present invention. The respective reflectors 40 are driven to a horizontal position 42 or to a vertical position 43. An optical path of the incident of ray from an input optical fiber 71 is switched by the vertical reflectors 42, such that the ray of light is incident on an output optical fiber 72. Since a diameter of the optical fibers 71 and 72 is relatively small, the ray of light from the input optical fiber 71 is not transmitted to the output optical fiber 72 when the reflector 40 is not pivoted by exactly 90°. According to the present invention, since the side electrode 30 serves as a stopper, the reflector 40 can be easily pivoted to an exact angle of 90°.

FIGS. 6A through 6G show a fabricating method of microactuators according to the present invention. FIGS. 6A, 6F and 6G are sectional views taken on line II—II of FIG. 2. FIGS. 6B through 6E are sectional views taken on line II of FIG. 2. The fabricating process of the microactuator according to the present invention will be described below.

First, a conductive seed layer is formed on the wafer 10 which is vapor-deposited with an insulating layer. Next, through a photolithography of the seed layer, the lower electrode 20, side electrode base 82, and post-base 81 are formed. Then, on the upper surface of the side layer which is patterned into the wafer 10, lower electrode 20, side electrode base 82 and post-base 81, a thick photo-resist layer 90 is laminated and heat processed at the temperature of 90° C. The result of the above processes is shown in FIG. 6A.

Next, a coating frame 91 is formed by partially eliminating the thick photo-resist layer 90 by photolithography, such that the lower electrode 20 is covered by the thick photo-resist layer 90 while the side electrode base 82 is exposed. Then, an insulating film 100 is vapor-deposited in the coating frame 91 by sputtering. Preferably, the coating frame 91 is formed not by a general developing process but by Reactive Ion Etching so as to ensure a perpendicularity of the sides of the coating frame 91. The result of the above processes is shown in FIG. 6B.

Next, as shown in FIG. 6C, the side electrode base 82 is exposed by etching the insulating film 100. Then, as shown in FIG. 6D, a conductive material is laminated on the side electrode 30. By doing so, the lower electrode 20 and the side electrode 30 are electrically connected to each other. The height of the side electrode 30 is preferably lower than the height of the coating frame 91.

As shown in FIG. 6E, the photo-resist layer 110 is formed on the side electrode 30 and the coating frame 91, and then heat processed. Here, the heat processing temperature is preferably lower than the heat processing temperature for the thick photo-resist layer 90, but higher than 150° C.

Then, by eliminating the corresponding portions of the thick photo-resist layer 90 and photo-resist layer 110 by the Reactive Ion Etching in a manner of exposing the post-base 20, a post-hole 51 is defined. Next, a high reflectivity metal is laminated on the upper surface of the photo-resist layer 110 and the post-hole 51. The metal layer is then etched, forming the reflector 40, supporting posts 50, and torsion springs 60. The result of the above processes is shown in FIG. 6F.

Finally, as shown in FIG. 6G, the remaining thick photo-resist layer 90 and the photo-resist layer 110 are eliminated by plasma etching, and the final form of the microactuator is completed.

As described above, the microactuator employing the side electrode 30 according to the present invention is driven with a low voltage, and pivots the reflector 40 accurately and stably without requiring a separate device, due to the presence of the side electrode 30 which acts as a stopper preventing the reflector 40 from pivoting beyond an angle of 90 degrees.

Further, according to the present invention, since the pivoting stroke of the reflector 40 and the height of the side electrode 30 are reduced by forming the reflector 40 to have asymmetric sides, the microactuator is more easily fabricated.

It is to be understood, however, that even though the present invention has been described with reference to the annexed drawings which depict the preferred embodiment thereof, the present invention is not limited to that embodiment, and may be modified in ways understood by those ordinarily skilled in the art without departing from the general principle and scope of the invention expressed in the appended claims.

What is claimed is:

1. A microactuator comprising:

a wafer;

a lower electrode formed on an upper surface of the wafer;

a side electrode formed on the upper surface of the wafer in a perpendicular relation with the lower electrode;

a pair of supporting posts protruding from the upper surface of the wafer, spaced from the lower electrode at a predetermined distance, respectively;

a reflector spaced from the side electrode at a predetermined distance, and facing the lower electrode; and elastic means, disposed between the reflector and the supporting posts, for elastically supporting the reflector and enabling pivoting movement of the reflector.

2. The microactuator as claimed in claim 1, wherein the elastic means comprises a pair of torsion springs.

3. The microactuator as claimed in claim 1, wherein the reflector is divided by a fulcrum line into one side facing the lower electrode and an other side which is longer than the one side.

4. The microactuator as claimed in claim 1, wherein the reflector is divided by a fulcrum line into one side facing the lower electrode, and an other side including a hole formed therein, said hole minimizing the level of electrostatic force applied to the side electrode.

5. The microactuator as claimed in claim 1, wherein the reflector is divided by a fulcrum line into one side facing the lower electrode and an other side which is longer than the one side, the longer other side having a hole formed therein, said hole minimizing the level of electrostatic force applied to the side electrode.

6. A microactuator comprising:

a wafer;

a lower electrode formed on an upper surface of the wafer;

a side electrode formed on the upper surface of the wafer in a perpendicular relation with the lower electrode;

a pair of supporting posts protruding from the upper surface of the wafer, spaced from the lower electrode at a predetermined distance, respectively;

a reflector spaced from the side electrode at a predetermined distance, and facing the lower electrode; and a pair of torsion springs disposed between the reflector and the supporting posts, for elastically supporting the reflector and enabling pivoting movement of the reflector.

\* \* \* \* \*